Patented June 6, 1950

2,510,282

UNITED STATES PATENT OFFICE 2,510,282

β-NITRO SULFONIC COMPOUNDS AND METHOD OF MAKING SAME

Marvin H. Gold, Chicago, Ill., assignor to The Visking Corporation, Chicago, Ill., a corporation of Virginia No Drawing. Application March 23, 1946, Serial No. 656,788

17 Claims. (Cl. 260—513)

This invention, which is a continuation-in-part of copending application Serial No. 617,929, filed September 21, 1945, relates to new chemical compounds and to the method of making the same. More particularly, it relates to β-nitro sulfonic acids and salts thereof as well as to a method of preparing the same.

The term β- (beta) as used herein defines the arrangement wherein the carbon atom attached to the nitro group is adjacent to the carbon atom holding the sulfonic acid group.

The β-nitro sulfonic acids and salts thereof which constitute one phase of this invention can be represented by the following generic formula:

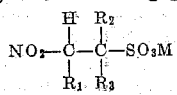

wherein $R_1$ represents hydrogen, alkyl, aryl, halogen, alkoxy or aryloxy group, $R_2$ represents hydrogen, alkyl, aryl, halogen, alkoxy or aryloxy group, $R_3$ represents hydrogen, alkyl, aryl, halogen, alkoxy or aryloxy group, and M represents hydrogen, a metallic ion, ammonium or substituted ammonium ion.

The salts of β-nitro sulfonic acids are obtained according to one phase of this invention by reacting the selected nitro olefin with a metal, ammonium or N-substituted ammonium bisulfite. In the process, generally the selected olefin as such or in an appropriate solvent is added to an aqueous solution of the selected bisulfite. The bisulfite adds to the nitro olefin as shown by the following equation illustrating the reaction which takes place when nitroethylene is added to an aqueous solution of ammonium bisulfite:

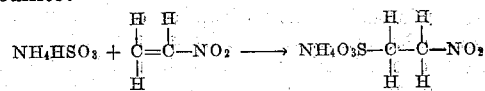

As is indicated by the above equation, theoretically 1 mol of bisulfite reacts with 1 mol of nitro olefin. In practice, however, a slight excess of bisulfite is utilized, though, of course, the reactants may be used in the theoretical amount required for the reaction or the nitro olefin may be used in excess of the theoretical amount required for the reaction.

The reaction is generally exothermic and requires external cooling to maintain it at optimum temperature. Nitro olefins of low molecular weight react with bisulfites at a lower temperature than those of higher molecular weight. Though in the preferred operation of the process the reaction was carried out at a temperature of from 10° C. to 60° C., it is to be understood, however, that temperatures higher than 60° C. and lower than 10° C. can also be used.

The nitro olefin which constitutes one of the reactants can be represented by the following general formula:

wherein $R_1$ represents hydrogen, alkyl, aryl, halogen, alkoxy or aryloxy group, $R_2$ represents hydrogen, alkyl, aryl, halogen, alkoxy or aryloxy group, and $R_3$ represents hydrogen, alkyl, aryl, halogen, alkoxy or aryloxy group.

As illustrative specific nitro olefins which can be used in the process are the following:

2-nitro-1-butene
2-phenyl-1-nitroethylene
1-nitropropene
2-nitropropene
Nitroethylene
1-phenyl-1-nitroethylene
1-phenyl-1-nitropropene
1-naphthyl-1-nitroethylene
1-naphthyl-1-nitropropene
2-naphthyl-1-nitropropene
1-chloro-1-nitroethylene
1-chloro-1-nitropropene
1-methoxy-1-nitroethylene
1-methoxy-2-nitroethylene
2-methoxy-2-phenyl-1-nitroethylene
2-phenoxy-1-nitroethylene In place of the nitro olefins, nitro cyclo compounds, such as 1-nitrocyclohexene and 2-methyl-1-nitrocyclohexene, can be used as one of the reactants.

The bisulfite which is utilized in the process can be any metal, ammonium, or N-substituted ammonium bisulfite which is water-soluble. Alkali metal bisulfites (such as sodium bisulfite and potassium bisulfite), calcium bisulfite, magnesium bisulfite, zinc bisulfite, etc. are illustrative metal bisulfites which can be used in the process. Bisulfites of the following N-substituted ammonium ions are illustrative examples of specific N-substituted ammonium bisulfites which can be used in the process:

Any alkaloid,
Methyl ammonium,
Dimethyl ammonium,
Trimethyl ammonium,
Methyl dibenzyl ammonium,
Dimethyl benzyl ammonium,
Diethyl phenyl ammonium,
Cetyl dimethyl ammonium,
Quinolinium,
Pyridinium,
Morpholine,
N-methyl morpholine,
Ethyl diethanol ammonium, Triethanol ammonium,
Piperidinium,
N-methyl piperidinium, etc.

In general, in order to obtain the desired nitrosulfonate the pH of the aqueous solution of the selected bisulfite must usually be at least 5.4. When the selected aqueous bisulfite solution is of a pH lower than 5.3, the pH tends to drop to lower values during the course of the reaction and may drop to as low as 1.5 or lower. Under such conditions, practically none of the desired nitrosulfonate can be isolated and only one-half of the theoretical amount of nitro olefin is used up. The product or products which result under such conditions of low pH value are extremely water-soluble, hygroscopic and difficult to purify.

When the selected aqueous solution of the selected bisulfite is of a pH of from 5.3 to below 5.4 the pH of the reaction mixture remains somewhat constant, and a mixture of the desired nitrosulfonate and the water-soluble product obtained under low pH condition is obtained.

When the aqueous solution of the selected bisulfite is of a pH of at least 5.4, such as between 6 and 7 and preferably 6.2 to 6.8, only the desired nitrosulfonate is obtained. With bisulfate solutions of such pH's (5.4 to 7), the alkalinity of the reaction mixture increases so that the pH of the reaction mixture rises as the reaction proceeds.

When the pH of the bisulfite solution is such that the pH of the reaction mixture rises above about 7.5, the resulting nitrosulfonates tend to enolize and then form salts of the acid hydrogen of the enolic nitro groups. Thus, the reaction mixture at pH's above 7.5 tends to consist of a mixture of the normal nitrosulfonate salt and the enol nitrosulfonate double salt. This mixture can all be reconverted back to the normal salt by lowering the pH to, for example, between 6 and 7. The lowering of the pH can be obtained by acidifying the reaction mixture, such as preferably with sulfur dioxide.

When an aqueous solution of a sulfite, such as sodium or potassium sulfite which has a pH within the range of about 9.5 to 10.0, is reacted with a nitro olefin, only the enol sulfonate double salt is obtained. The chemical structure of such a salt can be represented by the following general formula:

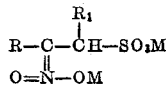

wherein

M represents the metallic ion, ammonium or substituted ammonium,

R represents either a hydrogen, alkyl, aryl, alkoxy, aryloxyl, or halogen group, and R₁ represents either a hydrogen, alkyl, aryl alkoxy, aryloxyl, or halogen group.

The precise double salt depends on the reactants employed. Any of the olefins and any of the sulfites of the metal, ammonium or substituted ammonium ion hereinbefore mentioned can be used.

Herein, wherever pH values are referred to, it is to be understood that they were determined electromatically with a glass electrode. In general, when the pH of the bisulfite solution is to be increased, it is accomplished by means of bases corresponding to the cation of the bisulfite being used, and, when it is to be decreased, it is effected by acids or anhydrides corresponding to the anion of the bisulfite used.

The invention can be practiced either by adjusting the pH of the bisulfite solution prior to the reaction or by maintaining the pH of the reaction mixture. In the latter process, the nitro olefin can be continuously added to an aqueous solution of the selected bisulfite held at the desired pH, such as 6 to 7, by adding sulfur dioxide and the required base (metal oxide, metal hydroxide, ammonia, or N-substituted ammonia) at such a ratio as to maintain the pH between 6 and 7 at a rate equivalent to the added nitro olefin. By continuously removing a portion of the reaction mixture to separate the crystalline product therefrom and returning the resultant filtrate in a continuous manner to the reaction mixture, the process can be made continuous.

The previously described process of preparing nitrosulfonate salts produces a metal, ammonium, or N-substituted ammonium salt of β-nitro sulfonic acid. Such a salt can, in accordance with another phase of this invention, be converted to the corresponding free nitro sulfonic acid or a salt containing any desired cation. Of course, a nitrosulfonate salt containing a desired cation can also be obtained directly by the use of a bisulfite salt of such cation.

The free nitro sulfonic acid is prepared, in general, from the bisulfite addition product by ion exchange using any of the well-known ion exchange procedures and materials, such as, for example, a cation exchange resin. Thus, by passing a salt of the nitro sulfonic acid through a column of an acid form of cation exchange resin, an aqueous solution of the free nitro sulfonic acid is obtained. The solution of the free nitro sulfonic acid can be concentrated or diluted as desired by the appropriate removal or addition of water. If desired, the free sulfonic acid can be removed from solution in any appropriate manner.

In that form of the invention wherein a salt having a cation other than that obtained by the hereinbefore described bisulfite addition process is desired, such salt can be obtained by appropriate reaction of the free nitro sulfonic acid and a compound containing the desired cation. In one embodiment of this form of the invention, the aqueous solution of the free nitro sulfonic acid obtained from a column of a cation exchange resin with or without dilution or concentration as desired is treated with an equivalent quantity of an oxide, hydroxide, or carbonate of any desired cation or substituted ammonia. The salts are obtained by evaporation of the water and are purified by recrystallization from appropriate solvents.

Alternatively, a solution of a bisulfite addition product can be passed over a cation exchange resin which has been converted to the desired cation form. The resulting aqueous effluent contains the new cation salt of the nitro sulfonic acids.

The β-nitro sulfonic acids or their salts can also, in accordance with another phase of this invention, be converted to the corresponding β-amino sulfonic acids. According to this phase of the invention, the hereinbefore mentioned β-nitro sulfonic acids or salts thereof are reduced to the corresponding amino sulfonic acid.

The precise β-amino sulfonic acid obtained depends on the β-nitro sulfonic acid or salt thereof reduced. In general, the β-amino sulfonic acid which can be obtained can be represented by the following general formula:

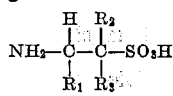

wherein
R₁ represents hydrogen, alkyl, aryl, alkoxy or aryloxy group,
R₂ represents hydrogen, alkyl, aryl, alkoxy or aryloxy group, and
R₃ represents hydrogen, alkyl, aryl, alkoxy or aryloxy group.

Preferably, the reduction is carried out by either an iron reduction in aqueous solution or by hydrogenization using a catalytic agent, such as nickel, although other known reducing procedures can be used.

The manner and details for practicing the invention will become more apparent from the specific examples hereinafter set forth, it being understood that the invention is not restricted to such specific examples which are set forth as illustrative embodiments only. In the examples, the proportions are parts by weight, and the temperatures are the uncorrected centigrade thermometer readings.

PREPARATION OF SALTS OF β-NITRO SULFONIC ACIDS

Example 1

To a well-stirred solution of 538 parts of a 43% aqueous ammonium bisulfite solution of a pH of 6 and initially brought to 30° was added 226 parts of 2-nitro-1-butene over a period of fifteen minutes. By external cooling, the reaction temperature was kept between 35°–40°. The crystalline product separated as the reaction proceeded. When addition was complete, stirring was continued while the temperature was kept between 35°–40° for thirty minutes longer. Then the reaction mixture was cooled to 10° and the product separated by filtration. The filtrate was concentrated and additional quantities of the product were recovered by crystallization therefrom to give a final yield of 88% of ammonium-2-nitrobutane-1-sulfonate. A sample purified for analysis by crystallization from methanol melted with decomposition at 203°–206°.

Example 2

To a well-stirred solution of 23.2 parts of a 43% aqueous ammonium bisulfite solution of a pH of 6 and warmed to 40° was added a solution of 15 parts 2-phenyl-1-nitroethylene in 15 parts dioxan over a period of about five minutes while keeping the reaction temperature at 40° by external cooling. After stirring the reaction mass, while the temperature was maintained at 40°, thirty minutes longer, the mixture was cooled by means of an ice-bath, thereby causing crystallization of the reaction product. The crystallized product was removed by filtration. The additional reaction product was isolated in a similar manner after concentrating the filtrate under reduced pressure. The desired product was then separated from inorganic material by taking up in hot ethanol. Upon the addition of benzene and allowing the material to crystallize slowly, 20 parts (80% yield) of ammonium-2-nitro-1-phenylethane-1-sulfonate was obtained, melting with decomposition at 170°–174°. This material was found to have two melting points. Upon rapid crystallization from concentrated ethanolic solutions, a low melting form could often be obtained. Either form is convertible to the other by seeding or the mode of crystallization. The purified materials had the melting points of 130°–131° and 170°–171° with decomposition.

Example 3

To a well-stirred solution of 550 parts of a 43% aqueous ammonium bisulfite solution of a pH of 6 and warmed to 30° was added 198 parts of 1-nitropropene over a period of thirty minutes while the reaction temperature was kept between 35°–40° by external cooling. After the addition was completed, stirring was continued, while the temperature was kept between 35°–40°, for an additional thirty minutes. The resulting clear solution was concentrated under reduced pressure to a thick viscous oil. This was taken up in hot ethanol, leaving behind a small amount of inorganic bisulfite. Upon the addition of methyl isobutyl ketone and cooling in a refrigerator to a temperature of 5°, a total of 350 parts (in three crops), corresponding to 83% yield of ammonium-1-nitropropane-2-sulfonate, was obtained. The purified product, after several recrystallizations from ethanol - methyl isobutyl ketone mixtures, melted at 141°–143°.

This product is of a soft waxy crystalline nature and appears to form solid gels with solvents such as benzene and various ketones.

Example 4

To a well-stirred solution of 200 parts of a 43% aqueous ammonium bisulfite solution having a pH of 6 was added 72.6 parts of 2-nitropropene over a period of fifteen minutes. The reaction temperature was kept between 30°–40° by external cooling. Stirring was continued for an additional thirty minutes at room temperature. Then the reaction mixture was cooled to 10° and the crystalline product was separated by filtration. Some additional material was obtained by crystallization at 10° from the filtrate after inorganic salts precipitated with methanol were removed and the filtrate concentrated under reduced pressure. A total yield of 135 parts (87% yield) of ammonium-2-nitropropane-1-sulfonate was recovered in this manner. The product purified for analysis by recrystallization from methanol melted with decomposition at 190°–191°.

Example 5

To a well-stirred solution of 125 parts of a 43% aqueous ammonium bisulfite solution of a pH of 6 and held at 15°–20° was added 38 parts of pure nitroethylene over a period of thirty minutes. Stirring was then continued at room temperature for an additional thirty minutes. At the end of this period the reaction mixture was cooled to 5° and the crystalline product separated by filtration. The filtrate was concentrated and some additional product was obtained therefrom by crystallization at 5° to give a total yield of 89.5 parts or 70% of ammonium-2-nitroethane-1-sulfonate. A sample purified for analysis by recrystallization from ethanol melted with decomposition at 191.5°–192°.

Example 6

The pH of a quantity of an aqueous saturated solution of ammonium bisulfite containing an excess of ammonium bisulfite required for the reaction was adjusted to 6.5. While such solution was well stirred and held at a temperature of 20°–30° C., 2556 g. of 2-nitro-1-butene was added. During the course of the reaction, sulfur dioxide and ammonia were bubbled into the solution so as to maintain a constant pH of 6.5. When the addition was completed, the reaction mixture was cooled and the crystalline product filtered. The dried product which analyzed for about 1% inorganic sulfate amounted to 5000 g. or 97.8% yield.

Example 7

A solution of 105 g. C. P. sodium metabisulfite (0.5 mol) in 300 cc. water gave a pH of 3.9 when measured by means of a glass electrode. Upon the addition of 20 cc. of 50% sodium hydroxide the pH was raised to 6.2. Then 100 g. of 2-nitro-1-butene was added with efficient stirring while keeping the temperature below 40° C. When the addition was completed the material was cooled and filtered. The filtrate was concentrated and cooled, causing it to deposit a second crop of crystals. The total yield was 150 g. (86%) of sodium 2-nitrobutane-1-sulfonate. The product melted at 224° with decomposition.

Example 8

A solution of 122 g. C. P. potassium metabisulfite (0.5 mol) in 300 cc. water gave a pH of 4.85 when measured with a glass electrode. Upon the addition of 10 cc. of 50% potassium hydroxide the pH was raised to 6.5. Then 100 g. of 2-nitro-1-butene was added with efficient stirring while keeping the temperature below 40°. When the addition was completed, the crystalline product was isolated, as in Example 7, to give 145 g. (77%) yield of potassium 2-nitro-butane-1-sulfonate. It melted at 234° C.

Example 9

A solution of 130 g. (1.03 mol) sodium sulfite in 600 cc. water gave a pH reading of 9.79 with a glass electrode. The solution was stirred rapidly and 100 g. of 2-nitro-1-butene was added dropwise while holding the temperature at about 40° C. The aqueous solution which resulted was then concentrated under reduced pressure to give a mass of crystals M. P. 190° C.

PREPARATION OF β-NITRO SULFONIC ACID AND SALTS THEREOF

Example 10

A glass column filled with Zeo Karb cation exchange resin was treated with a 4% aqueous solution of hydrochloric acid to convert the resin to the acid form. Then excess acid was removed by washing the column with distilled water until no more chloride ion could be detected in the effluent. Next a solution of 50 g. of ammonium-2-nitrobutane-1-sulfonate in 1250 cc. distilled water was passed through the column. The exchange was completed by washing with distilled water until the effluent no longer gave a test for acidity. The combined effluent contained the free 2-nitro-butane-1-sulfonic acid. It was measured and an aliquot portion titrated for acidity. The selected amine, oxide, hydroxide or carbonate in equivalent quantity was reacted with the solution and, upon evaporation of the mixture, the corresponding salt of the nitro sulfonic acid was obtained. Several illustrative salts and their analyses obtained in this procedure are listed in the "Table I" hereinafter set forth.

PREPARATION OF SALTS OF β-NITRO SULFONIC ACID BY ION EXCHANGE

Example 11

The column of a Zeo Karb ion exchange resin was saturated with a dilute aqueous solution containing 3%–5% of sodium chloride. Then after washing the column thoroughly with distilled water, a 4% solution of ammonium-2-nitrobutane-1-sulfonate was passed through. The effluent and washings were concentrated on the steam bath to give sodium-2-nitrobutane-1-sulfonate, which is identical with the product obtained by the procedure of Example 10 when sodium carbonate or hydroxide was reacted with the free acid.

TABLE I.—SALTS OF β-NITRO SULFONIC ACIDS

| Example | Formula | M. P., °C. | Per Cent Cation | | Per Cent Nitrogen | | Per Cent Sulfur | |
|---|---|---|---|---|---|---|---|---|
| | | | Found | Theory | Found | Theory | Found | Theory |
| 1 | $C_2H_5CH(NO_2)CH_2SO_3NH_4$ | 203°–206° dec | | | 13.51 | 13.99 | 16.03 | 15.91 |
| 2 | $C_2H_5CH(SO_3NH_4)CH_2NO_2$ | 130°–131° | | | 11.20 | 11.29 | 12.90 | 12.90 |
| 3 | $CH_3CH(SO_3NH_4)CH_2NO_2$ | 170°–171° dec / 141°–143° | | | 14.57 | 15.05 | 17.43 | 17.22 |
| 4 | $CH_3CH(NO_2)CH_2SO_3NH_4$ | 190°–191° dec | | | 14.46 | 15.05 | 17.04 | 17.22 |
| 5 | $NO_2CH_2CH_2SO_3NH_4$ | 191.5°–192.5° dec | | | 16.20 | 16.23 | 19.11 | 18.63 |
| 7 | $C_2H_5CH(NO_2)CH_2SO_3Na$ | 224° | | | | | | |
| 8 | $C_2H_5CH(NO_2)CH_2SO_3K$ | 234° | | | | | | |
| 10–11 | $C_2H_5CH(NO_2)CH_2SO_3Na$ | 225° dec | 11.0 | 11.2 | | | 15.15 | 15.6 |
| 10 | $C_2H_5CH(NO_2)CH_2SO_3K$ | 232° dec | 17.6 | 17.7 | | | 14.1 | 14.5 |
| 10 | $(C_2H_5CH(NO_2)CH_2SO_3)_2Ba$ | 260° dec | 27.5 | 27.4 | | | 10.3 | 10.0 |
| 10 | $(C_2H_5CH(NO_2)CH_2SO_3)_2Ca$ | >300° | 9.94 | 9.9 | 7.22 | 6.95 | 15.55 | 15.85 |
| 10 | $(C_2H_5CH(NO_2)CH_2SO_3)_2Co$ | 210°–211° dec | 13.33 | 13.9 | 6.26 | 6.62 | | |
| 10 | $C_2H_5CH(NO_2)CH_2SO_3Tl$ | 191°–192° dec | | | 3.54 | 3.62 | 8.25 | 8.27 |
| 10 | $C_2H_5CH(NO_2)CH_2SO_3.Brucine$ | 187°–190° dec | | | 7.64 | 7.27 | 5.56 | 5.58 |
| 10 | $(C_2H_5CH(NO_2)CH_2SO_3)_2Pb$* | 145°–148° dec | 37.1 | 36.2 | 4.38 | 4.9 | | |
| 10 | $(C_2H_5CH(NO_2)CH_2SO_3)_2Zn$† | 168°–172° dec | 14.6 | 15.1 | | | 13.9 | 14.9 |

*The lead salt does not give a sharp analysis as it was contaminated by a polymeric lead salt, which could not be removed completely after many recrystallizations.
†The zinc salt was difficult to purify due to its extreme tendency toward coordination with most crystallization solvents.

*Analysis for the enol double salt.—*

$C_4H_7O_5NSNa_2$

Sodium found, 19.6%; calculated, 20.2%.

When some of these crystals were redissolved in water and the solution lowered in pH to 6.0 by the additin of hydrochloric acid, the normal sodium-2-nitrobutane-1-sulfonate was recovered.

The properties of the products of Examples 1–11 inclusive are set forth in the following table:

PREPARATION OF β-AMINO SULFONIC ACIDS

Example 12

In a reaction vessel fitted with efficient stirrer and reflux condenser were placed 12 parts of iron filings and 55 parts of water. Then with rapid agitation was added 0.5 part concentrated hydrochloric acid. The mixture was heated to reflux and then 8 parts of ammonium-1-nitropropane-2-sulfonate in 15 parts of water were added dropwise. The reaction was stirred and refluxed for four hours. Then the precipitated iron oxides were removed by filtration of the hot solution. The filtrate was then made slightly alkaline with ammonium hydroxide and a little hydrogen peroxide added to oxidize ferrous ions to ferric. After stirring with a little charcoal and filtering, the filtrate was evaporated to a small volume. Addition of ethyl alcohol caused the slow crystallization of 1-aminopropane-2-sulfonic acid. Recrystallization from aqueous alcohol gave a product melting with decomposition at 283°–286°.

Example 13

In a suitable reaction vessel were placed 92 parts of iron filings and 150 parts of water. The mixture was vigorously stirred and 1.5 parts of concentrated hydrochloride acid were added. After five minutes 172 parts of ammonium-2-nitroethane-1-sulfonate and 50 parts more of water were added. The reaction mixture was slowly heated to reflux over a period of fifteen minutes. Then a solution of 50 parts concentrated hydrochloric acid in 50 parts of water was added dropwise with continued reflux over a period of thirty-five minutes. After refluxing and stirring for an additional hour, the reaction mixture was clarified with charcoal and evaporated to a small volume. Upon addition of ethyl alcohol, the desired 2-aminoethane-1-sulfonic acid crystallized from solution. Several recrystallizations from aqueous ethyl alcohol gave a product decomposing at 310°. A mixed melting point with an authentic sample of taurine gave no lowering in melting point.

Example 14

In a suitable reaction vessel were placed 42 parts of iron filings and 50 parts of water. Vigorous agitation was employed and 1 part of concentrated hydrochloric acid was added. After five minutes a solution of 62 parts of ammonium-2-nitropropane-1-sulfonate in 50 parts of water was added. The reaction mixture was then gradually heated to reflux. At the point of reflux a solution of 23 parts hydrochloric acid in 50 parts of water was added dropwise over a period of thirty minutes, after which reflux was continued to the end of an hour. The hot solution was filtered and the precipitated iron oxide was washed with water. The combined washings were made basic with ammonia and treated with a little hydrogen peroxide. Then after clarification with charcoal, the solution was concentrated and a little ethyl alcohol added. The resulting 2-aminopropane-1-sulfonic acid, after several recrystallizations, melted at 318°–320° with decomposition.

Example 15

In a suitable reaction vessel were placed 35 parts of iron filings and 75 parts of water. Vigorous agitation was employed and 1 part of concentrated hydrochloric acid was added. After five minutes of stirring, 50 parts of ammonium-2-nitrobutane-1-sulfonate were added, followed by 75 parts more of water. The mixture was gradually heated to reflux and then 16 parts concentrated hydrochloric acid in 20 parts of water were added dropwise over a period of twenty minutes. After continued stirring and refluxing for one hour, the hot mixture was filtered. The precipitated iron oxides were washed with warm water. The combined filtrate and washings were made basic with ammonia and treated with a little hydrogen peroxide. Then after clarifying the solution with charcoal, it was concentrated to a small volume and allowed to crystallize. The resulting 2-aminobutane-1-sulfonic acid, after several recrystallizations from water, melted with decomposition at 303°–306°.

Example 16

A mixture of 20 parts of ammonium-2-nitrobutane-1-sulfonate, 100 parts of distilled water, and 3 parts of Raney nickel catalyst was placed in a hydrogenation bomb. The bomb was sealed and filled with hydrogen to a pressure of 1200 pounds. Then shaking was started and the bomb heated to 75°–80°. After two hours at this temperature there was no longer any drop in pressure. The bomb was cooled, opened, and the solution filtered from the nickel catalyst. The filtrate was concentrated and allowed to crystallize, giving 2-aminobutane-1-sulfonic acid, identical with that obtained by iron reduction in Example 15.

Example 17

In a suitable reaction vessel were placed 50 parts of iron filings and 100 parts of water. The mixture was stirred vigorously and 1 part of hydrochloric acid was added. Then heat was applied and the reaction brought to the reflux temperature. At this point, a solution of 15 parts of ammonium-2-nitro-1-phenylethane-1-sulfonate in 50 parts of water was dropped in over a period of fifteen minutes. Then the reaction was stirred under reflux for three hours. At the end of this period the hot mixture was filtered. The filtrate was made basic with ammonia and then oxidized with a little hydrogen peroxide. Then after clarifying with charcoal, the solution was concentrated and a little methanol added. The 2-amino-1-phenylethane-1-sulfonic acid crystallized in white platelets. Recrystallization from aqueous methanol gave a product melting at 379° with decomposition.

The properties of the products of Examples 12–17 inclusive are set forth in the following table:

TABLE II.—AMINO SULFONIC ACIDS

| Example | Formula | M. P., °C. | Per Cent Sulfur Theory | Per Cent Sulfur Found | | Per Cent Nitrogen Theory | Per Cent Nitrogen Found | |
|---|---|---|---|---|---|---|---|---|
| | | | | I | II | | I | II |
| 13 | $NH_2CH_2CH_2SO_3H$ | 310° dec | 25.62 | 25.48 | 25.44 | 11.20 | 11.09 | 11.34 |
| 14 | $NH_2CH(CH_3)CH_2SO_3H$ | 318°–320° dec | 23.03 | 23.04 | 23.00 | 10.06 | 10.14 | 9.83 |
| 12 | $NH_2CH_2CH(CH_3)SO_3H$ | 283°–286° dec | 23.03 | 22.95 | 23.23 | 10.06 | 9.73 | |
| 15–16 | $NH_2CH(C_2H_5)CH_2SO_3H$ | 303°–306° dec | 20.93 | 20.76 | 20.16 | 9.14 | 9.05 | 9.04 |
| 17 | $NH_2CH_2CH(C_6H_5)SO_3H$ | 379° dec | 15.92 | 16.20 | 16.05 | 6.97 | 7.20 | 7.07 |

It is to be understood that the foregoing data of Tables I and II were obtained from single preparations of each of the compounds, and, while such data will be useful in identifying these compounds, it is to be understood that the invention is not limited to products having the exact constants listed.

The Zeo Karb cation resin utilized in Examples 10 and 11 (product of Permutit Company) consists essentially of a sulfonated coal. Obviously, the invention is not restricted to such specific ion exchange resin and that other of the known appropriate ion exchange resins or salts can be used. The embodiment of the invention set forth in Example 11 is particularly suitable for monovalent cations, such as sodium, potassium, lithium, thallium, substituted ammonias, etc.

The ammonium salts of the nitro sulfonic acids are neutral salts, and, as shown in Examples 12–17 inclusive, such salts can be reduced to the corresponding amino compounds. The amino group is a basic group and, during the process of producing the same, produces an internal salt with the sulfonic radical which liberates free ammonia. The free ammonia is either vaporized out of the reaction mixture or neutralized by the addition of an acid, such as hydrochloric. When the cation of the salt of the nitro sulfonic acid undergoing reduction is a metal, an acid is added, as the reaction proceeds, to neutralize the metal hydroxide produced and form a neutral salt thereof. For example, if a calcium salt of the nitro sulfonic acid were reduced, an acid would be added, as the reaction proceeds, to neutralize the calcium hydroxide and form a neutral calcium salt.

In the method of reducing the salts of the nitro sulfonic acids, wherein the reduction is obtained through the use of iron, ferrous ions are produced. Ferric hydroxide is less soluble than ferrous hydroxide. Consequently, after the reduction operation all the iron is converted to the ferric state in order that it may be precipitated more completely and removed from the solution.

Any appropriate oxidizing agent to convert the ferrous ions to ferric ions can be used. Air may constitute such an oxidizing agent and when used it can be bubbled through the reaction medium. However, hydrogen peroxide is the preferred oxidizing agent since its action is faster and does not introduce any additional ions which might complicate the isolation of a pure product.

The use of charcoal in Examples 12–17 is not critical. It is used for the purpose of clarifying the reaction mixture when a pure white crystallized product is desired.

The instant invention provides nitro sulfonic acids and salts thereof which have not been previously known or described, and also new and effective processes for the production of such acids and salts.

The nitro sulfonic acids and salts thereof are useful as intermediates for chemical synthesis, and also, in certain cases, may find uses as wetting, detergent, or emulsifying agents.

The simplest $\beta$-amino sulfonic acid is known as taurine, which has been obtained by hydrolysis of taurocholic acid, and which has been found useful in the preparation of wetting, detergent and emulsifying agents. However, the major deterrent to its wider use has been its relatively high price.

The reduction of the new nitro sulfonic acids and salts thereof to the corresponding $\beta$-amino sulfonic acids provides a new procedure for the production of taurine and taurine-homologues by a relatively simple and cheap procedure.

Since it is obvious that various changes and modifications may be made in the above description without departing from the nature or spirit thereof, this invention is not restricted thereto except as set forth in the appended claims.

I claim:

1. A chemical compound having the following structural formula:

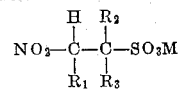

wherein $R_1$ is a member of the group which consists of hydrogen, alkyl, aryl, halogen, and alkoxy radicals, $R_2$ is a member of the group which consists of hydrogen, alkyl, aryl, alkoxy and aryloxy radicals, $R_3$ is a member of the group which consists of hydrogen, alkyl and aryl radicals and alkylene radicals in which case $R_1$ and $R_3$ and the carbon atoms attached to the nitro and sulfonic acid groups together form a cyclo aliphatic ring, M is a member of the group which consists of a metallic ion, ammonium, and a substituted ammonium ion.

2. Ammonium-2-nitroethane-1-sulfonate.
3. Ammonium-2-nitropropane-1-sulfonate.
4. Ammonium-2-nitrobutane-1-sulfonate.
5. A method of preparing $\beta$-nitro sulfonic compounds which comprises reacting a nitro olefin having the following structural formula:

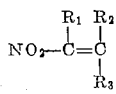

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a compound selected from the group which consists of water soluble sulfites and bisulfites in which the cation is selected from the group consisting of metals, ammonium, and N-substituted ammonium ions, said solution having a pH of at least 5.4 and removing the product from the reaction mixture at a pH of from 6 to 7.

6. A method of preparing $\beta$-nitro sulfonic compounds which comprises reacting a nitro olefin having the following structural formula:

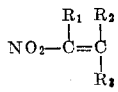

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a compound selected from the group which consists of water soluble sulfites and bisulfites in which the cation is selected from the group consisting of metals, ammonium and N-substituted ammonium ions, said solution having a pH of at least 5.4 and maintaining the reaction mixture at a pH of from 6 to 7.

7. A method of preparing β-nitro sulfonic compounds which comprises continuously reacting a nitro olefin having the following structural formula:

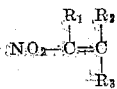

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a compound selected from the group which consists of water soluble sulfites and bisulfites in which the cation is selected from the group consisting of metals, ammonium, and N-substituted ammonium ions, said solution having a pH of at least 5.4, and adding sulfur dioxide and the required base at a ratio to maintain the reaction mixture at a pH of from 6 to 7 and at a rate equivalent to the added olefin.

8. A method of preparing β-nitro sulfonic compounds which comprises continuously reacting a nitro olefin having the following structural formula:

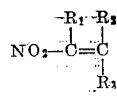

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a compound selected from the group which consists of water soluble sulfites and bisulfites in which the cation is selected from the group consisting of metals, ammonium, and N-substituted ammonium ions, said solution having a pH of at least 5.4, adding sulfur dioxide and the required base at a rate to maintain the reaction mixture at a pH of from 6 to 7 and at a rate equivalent to the added olefin, continuously removing a portion of the reaction mixture, separating the crystalline product therefrom and returning the filtrate in a continuous manner to the reaction mixture.

9. The method of preparing β-nitro sulfonic compounds which comprises reacting a nitro olefin having the following structural formula:

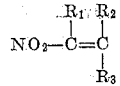

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a bisulfite selected from the class which consists of metal bisulfites, ammonium bisulfites and N-substituted ammonium bisulfites, said solution having a pH at least 5.4.

10. A method of preparing β-nitro sulfonic compounds which comprises reacting a nitro olefin having the following structural formula:

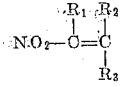

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a bisulfite selected from the class which consists of metal bisulfites, ammonium bisulfites and N-substituted ammonium bisulfites, said solution having a pH of from 6 to 7.

11. A method of preparing β-nitro sulfonic compounds which comprises reacting a nitro olefin having the following structural formula:

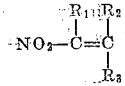

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a bisufite selected from the class which consists of metal bisulfites, ammonium bisulfites and N-substituted ammonium bisulfites, said solution being such as to produce a reaction mixture having a pH above 7, and subsequent to the completion of the reaction adjusting the pH of the reaction mixture to from 6 to 7.

12. A method of preparing β-nitro sulfonic compounds which comprises reacting a nitro olefin having the following structural formula:

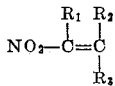

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a bisulfite selected from the class which consists of metal bisulfites, ammonium bisulfites and N-substituted ammonium bisulfites, said solution having a pH of from 6 to 7, and maintaining the pH of the reaction mixture at a pH of from 6 to 7.

13. A method of preparing β-nitro sulfonic compounds which comprises continuously reacting a nitro olefin having the following structural formula:

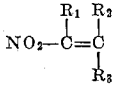

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a bisulfite selected from the class which consists of metal bisulfites, ammonium bisulfites and N-substituted ammonium bisulfites, said solution having a pH of from 6 to 7, and adding sulfur dioxide and the required base at a ratio to maintain a pH of from 6 to 7 and at a rate equivalent to the added olefin.

14. A method of preparing β-nitro sulfonic compounds which comprises continuously reacting a nitro olefin having the following structural formula:

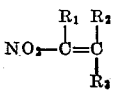

wherein $R_1$ is a member of the group which consists of hydrogen, alkyl, aryl, halogen and alkoxy radicals, $R_2$ is a member of the group which consists of hydrogen, alkyl, aryl, alkoxy, and aryloxy radicals, $R_3$ is a member of the group which consists of hydrogen, alkyl and aryl radicals and alkylene radicals in which case $R_1$ and $R_3$ and the carbon atoms linked by the double bond together form a cyclo olefinic ring, with an aqueous solution of a bisulfite selected from the class which consists of metal bisulfites, ammonium bisulfites and N-substituted ammonium bisulfites, said solution having a pH of from 6 to 7, adding sulfur dioxide and the required base at a ratio to maintain a pH of from 6 to 7 and at a rate equivalent to the added olefin, continuously removing a portion of the reaction mixture, separating the crystalline product therefrom, and returning the filtrate in a continuous manner to the reaction mixture.

15. A process for the preparation of ammonium-2-nitroethane-1-sulfonate which comprises reacting nitroethylene with an aqueous solution of ammonium bisulfite, the pH of which is from 6 to 7.

16. A process for the preparation of ammonium-2-nitropropane-1-sulfonate which comprises reacting 2-nitropropene with an aqueous solution of ammonium bisulfite, the pH of which is from 6 to 7.

17. A process for the preparation of ammonium-2-nitrobutane-1-sulfonate which comprises reacting 2-nitro-1-butene with an aqueous solution of ammonium bisulfite, the pH of which is from 6 to 7.

MARVIN H. GOLD.

REFERENCES CITED

The following references are of record in the file of this patent:

UNITED STATES PATENTS

| Number | Name | Date |
|---|---|---|
| 405,938 | Andresen | June 25, 1899 |
| 1,999,432 | Ulrich | Apr. 30, 1935 |
| 2,103,879 | Ufer | Dec. 28, 1938 |
| 2,170,380 | Holsten | Aug. 22, 1939 |
| 2,181,890 | Harris | Dec. 5, 1939 |
| 2,363,819 | Von Glan | Nov. 28, 1944 |
| 2,465,803 | Heath et al. | Mar. 29, 1949 |

FOREIGN PATENTS

| Number | Country | Date |
|---|---|---|
| 805,092 | France | Nov. 10, 1936 |
| 571,157 | Great Britain | 1945 |

OTHER REFERENCES

Kharasch et al.: J. Org. Chem., vol. 3 (1938).

Mayo: "Chemical Reviews," vol. 27, pp. 394 to 399 (1940).